United States Patent
Zumdome

(10) Patent No.: US 6,828,359 B2
(45) Date of Patent: Dec. 7, 2004

(54) RESIN BASED FLUORESCENT MARKING STAIN

(75) Inventor: William Zumdome, Bettendorf, IA (US)

(73) Assignee: Illinois Tool Works, Inc., Glenview, IL (US)

( * ) Notice: Subject to any disclaimer, the term of this patent is extended or adjusted under 35 U.S.C. 154(b) by 125 days.

(21) Appl. No.: 10/105,649

(22) Filed: Mar. 25, 2002

(65) Prior Publication Data

US 2003/0181549 A1 Sep. 25, 2003

(51) Int. Cl.$^7$ ............... C09D 11/16; C08K 5/12; B43K 5/00; B05C 17/00

(52) U.S. Cl. ............... 523/161; 106/31.15; 106/31.32; 106/31.57; 401/196; 524/296

(58) Field of Search ............... 523/160, 161; 524/296; 106/31.15, 31.32, 31.57; 401/17, 196

(56) References Cited

U.S. PATENT DOCUMENTS

| | | | |
|---|---|---|---|
| 4,186,020 A | * | 1/1980 | Wachtel .............. 523/161 |
| 4,243,694 A | * | 1/1981 | Mansukhani .......... 427/466 |
| 4,271,253 A | | 6/1981 | Hara et al. |
| 4,301,223 A | | 11/1981 | Nakamura et al. |
| 4,601,863 A | | 7/1986 | Shioi et al. |
| 4,936,916 A | | 6/1990 | Shinmitsu et al. |
| 5,203,638 A | * | 4/1993 | Redmond, Jr. ........... 401/17 |
| 5,236,621 A | * | 8/1993 | DiPietro ............ 252/301.35 |
| 5,614,289 A | | 3/1997 | Kobayashi et al. |
| 5,755,860 A | * | 5/1998 | Zhu ................. 106/31.15 |
| 5,837,042 A | * | 11/1998 | Lent et al. ........... 106/31.14 |
| 5,880,176 A | * | 3/1999 | Kamoto et al. ........ 523/172 |
| 5,897,938 A | | 4/1999 | Shinmoto et al. |
| 5,939,468 A | * | 8/1999 | Siddiqui ................ 523/161 |
| 6,074,465 A | * | 6/2000 | Fukuo et al. .......... 106/31.07 |
| 6,425,948 B1 | * | 7/2002 | Nowak et al. ......... 106/31.15 |
| 6,517,619 B1 | * | 2/2003 | Nowak et al. ......... 106/31.32 |
| 2003/0056689 A1 | | 3/2003 | Zumdome et al. |

* cited by examiner

Primary Examiner—Callie Shosho
(74) Attorney, Agent, or Firm—Mark W. Croll, Esq.; Donald J. Breh, Esq.; Welsh & Katz, Ltd.

(57) ABSTRACT

A resin based fluorescent marking stain is formulated from a resin present in a concentration of about 10 percent to about 20 percent of the marking stain, an active solvent for and compatible with the resin present in a concentration of about 65 percent to about 85 percent of the marking stain, a plasticizer present in a concentration of about 1.0 percent to about 5.0 percent of the marking stain, an optical brightener present in a concentration of about 0.5 percent to about 5.0 percent of the marking stain and a fluorescent dye present in a concentration of about 0.1 percent to about 5.0 percent of the marking stain.

20 Claims, 1 Drawing Sheet

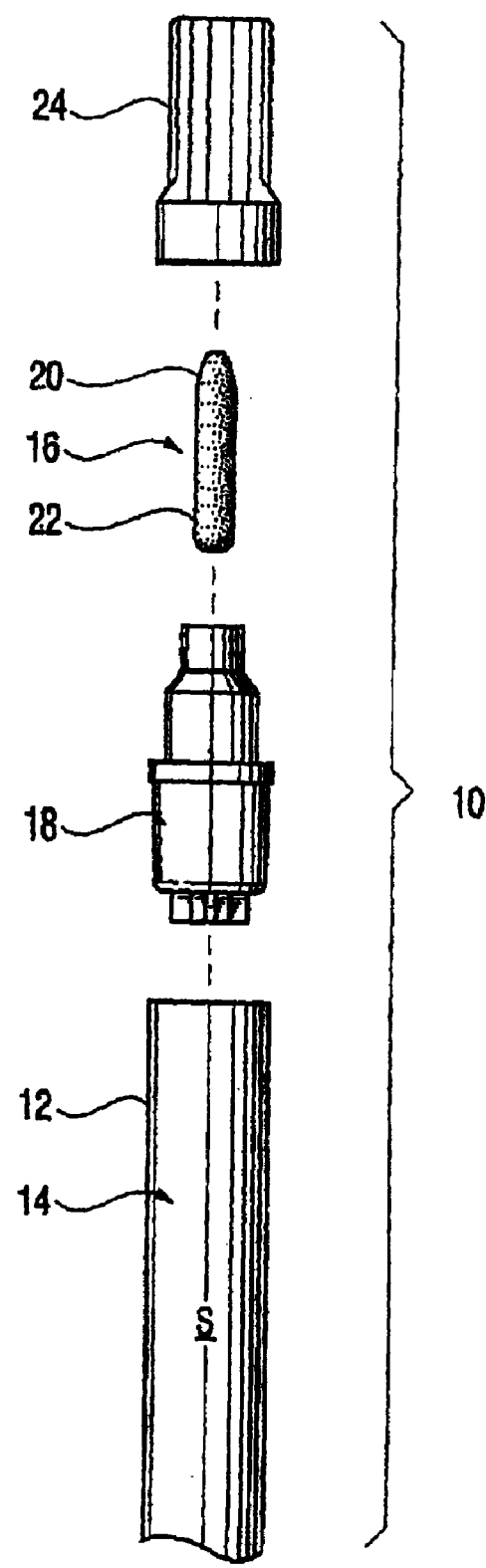

RESIN BASED FLUORESCENT MARKING STAIN

BACKGROUND OF THE INVENTION

The present invention is directed to a fluorescent marking stain. More particularly, the present invention is directed to a readily applyable, resin based fluorescent marking stain for use in coating or marking parts.

Parts or assemblies are often marked with paints or dyes to facilitate identification and/or location. This is particularly true when the parts or assemblies are used in dark or confined spaces. However, known paints or dyes for this use are simply colored. Thus, while this marking facilitates identification, it does not enhance the ability to identify or locate the parts in low light situations.

To this end, it has been found useful to provide the ability to locate or identify parts using enhanced visual means.

Accordingly, there exists a need for a fluorescent marking stain that enhances the ability to visually identify and locate parts. Desirably, such a stain is resin based and reduces or eliminates any corrosion of the marked parts or assemblies. Such a stain can be provided in a readily usable form to permit marking of parts.

BRIEF SUMMARY OF THE INVENTION

A fluorescent marking stain is used for marking items. The stain enhances the ability to visually identify and locate parts. Preferably, such a stain is readily usable in a variety of different forms to permit marking of parts. A present marking stain is yellow.

The stain is a resin based fluorescent marking stain and includes a resin, preferably an acrylic resin, present in a concentration of about 10 percent to about 20 percent of the marking stain. An active solvent, preferably acetone and an aromatic hydrocarbon, such as xylene, for and compatible with the resin is present in a concentration of about 65 percent to about 85 percent of the marking stain.

The stain can include a dye solvent. A preferred dye solvent, if used, is diacetone alcohol, present in a concentration of about 0.1 percent to about 10.0 percent of the marking stain and a plasticizer, preferably diisononyl phthalate, present in a concentration of about 1.0 percent to about 5.0 percent of the marking stain.

The stain further includes an optical brightener present in a concentration of about 0.5 percent to about 5.0 percent of the marking stain. In a present formulation, the optical brightener is an amino coumarin. The fluorescent dye is present in a concentration of about 0.1 percent to about 5.0 percent of the marking stain. In a present stain, the fluorescent dye is a quinoline dye that is yellow in color.

While a variety of different application forms is anticipated, a marking pen for marking with the marking stain includes a porous nib and a chamber for storing the stain, in which the nip is in fluid communication with the stain in the chamber.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is an exploded view of an exemplary pen for use with the fluorescent marking stain embodying the principles of the present invention.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

A resin based fluorescent marking stain in accordance with the present invention has been found to be useful for marking items. A preferred stain is of the type that will adhere to parts, including metal parts an the like. The preferred stain is formulated to greatly reduce or eliminate corrosion of the parts due to the stain. Although many types of stains or dyes are known, a stain for use in marking parts must be able to adhere to such parts without being readily removed or "rubbed off" of the parts so marked. Additionally, such a stain or dye must be formulated so as to not flake off of the parts so marked.

A present fluorescent marking stain is formulated from resin carried in a compatible active solvent. The stain includes a dye, an optical brightener, a plasticizer, and optionally a dye solvent. Preferably, the resin is an acrylic resin. Compatible active solvents include a wide variety of organic solvents, including chlorinated hydrocarbons, esters, ethers, hydrocarbons, ketones and the like. In one known formulation, the active solvent is a combination of acetone and an aromatic hydrocarbon, such as xylene. Other resins as well as other solvents compatible with acrylic resins and such other resins will be recognized by those skilled in the art.

In the present marking stain, the acrylic resin is provided in a solid form, preferably a free flowing bead form, such as that commercially available from NeoResins of Wilmington, Mass., under the trademark NeoCryl B-735. The acrylic resin can be dissolved in a variety of solvents, including aromatic, chlorinated and polar solvents and some aliphatic solvents and alcohols. The resin is present in a concentration of about 10 percent to about 20 percent of the stain, and preferably about 16.0 percent of the stain. Those skilled in the art will recognize the various acrylic and other polymers that can be used in the present marking stain, which other polymers are within the scope and spirit of the present invention.

The stain further includes an active solvent that is compatible with the resin. In a current formulation, the active solvent is a combination of acetone and an aromatic hydrocarbon. One such aromatic hydrocarbon is xylene. The active solvent is present in a concentration of about 65 percent to about 85 percent of the stain, and preferably about 75 percent of the stain. In a current formulation that uses xylene as the aromatic hydrocarbon, the acetone is present in a concentration of about 45 percent to about 55 percent (and preferably about 47 percent), and the xylene is present in a concentration of about 20 percent to about 30 percent (and preferably about 28.0 percent).

It is, however, anticipated that various other organic solvents can be used instead of either the acetone or the xylene. For example, another known aromatic hydrocarbon that is useful in formulating the present stain includes petroleum hydrocarbons, xylene, 1-2-4 trimethyl benzene and cumene, and is commercially available from ExxonMobil Chemical Corporation of Houston, Tex. under the product name Aromatic 100 Fluid.

Further yet, it is anticipated that a wide variety of other organic solvents will function well in the present marking stain. It is anticipated that chlorinated organic solvents including methylene chloride, trichloroethylene, and 1,1,1-trichloroethylene, esters including ethyl acetate, n-butyl acetate, isopropyl acetate, amyl acetate and Cellosolve acetate (available from the Union Carbide Corporation), ethers including dioxane and Cellosolve (also available from the Union Carbide Corporation), hydrocarbons including toluene, xylene and Aromatic 100 Fluid (discussed above and available from the ExxonMobil Chemical Company), and ketones including acetone, methyl ethyl ketone, methyl isobutyl ketone and cyclohexanone, will all function well as active solvents for the present marking stain.

In a present formulation in which acetone and xylene are used as the active solvent, the acetone and xylene generally are readily commercially available from a wide variety of chemical manufacturers and suppliers. For example, the acetone is commercially available from the Union Carbide Corporation of Danbury, Conn., (a subsidiary of the Dow Chemical Company) in purities of greater than 99 percent. The xylene is likewise readily available commercially from, for example, the ExxonMobil Chemical Company.

It has been found that this combination of solvents significantly reduces the overall volatile organic compounds (VOCs) of the marking stain. To this end, it is anticipated that other solvents can be used in formulation of the stain. Those skilled in the art will recognize the various solvents, combinations of solvents and proportions of selected solvents that will be compatible with the resin, which other solvents are within the scope and spirit of the present invention.

It has also been found that the combination of acetone and xylene provides for a quick-drying stain. That is, these solvent evaporate readily rapidly, those producing a fast drying, relatively "hard" and durable marking on the part or assembly. Likewise, it is anticipated that the use of other solvents will provide similar results. Those skilled in the art will recognize that the drying time is dependent upon film (or coating) thickness. It has been observed that the present marking stain, when applied so as to have a final film thickness of no more than about 0.0005 inches (0.05 mils, which is a "typical" film thickness) has a drying time of less than about 7 minutes.

The dye solvent is compatible with the resin and the dye, which dye will be discussed in more detail below. A preferred dye solvent is diacetone alcohol. In a preferred stain formulation, the diacetone alcohol is present in a concentration of about 0.1 percent to about 10.0 percent of the stain, and preferably about 6.0 percent of the stain. Unlike the active solvent, the dye solvent is a slower drying or evaporating solution. That is, the dye solvent tends to slow the evaporation and drying of the stain and more particularly, the dye. It is anticipated that other alcohols can be used as a dye solvent, which other alcohols will be recognized by those skilled in the art and are within the scope and spirit of the present invention.

In that the dye solvent tends to slow evaporation, it is anticipated that the use of somewhat slower evaporating active solvents will permit the reduction and possibly the elimination of the need for a dye solvent, so long as the active solvent serves to carry the dye. For example, it is anticipated that the use of an active solvent of acetone and the aforementioned Aromatic 100 Fluid will permit greatly reducing the dye solvent concentration, perhaps to zero, without detrimental effect.

Like the other solvents, the dye solvent is readily commercially available. For example, diacetone alcohol is commercially available from Ashland Specialty Chemical Company of Columbus, Ohio. A diacetone alcohol having a purity of about greater than 98 percent is preferred.

Optionally, to enhance the flow characteristics and "workability" of the marking stain, to enhance the durability of the stain, and to enhance the flexibility of the stain, one or more plasticizers can be included in the formulation. Plasticizers such as diisononyl phthalate and the like can be present in a concentration of about 1.0 percent to about 5.0 percent, and preferably about 1.5 percent of the stain. The exemplary plasticizer, diisononyl phthalate can be obtained commercially from Sunoco, Inc. of Philadelphia, Pa., under the product name PX 139 Diisononyl phthalate.

The marking stain further includes a fluorescent dye present in a concentration of about 0.1 percent to about 5.0 percent of the stain, and preferably about 0.3 percent of the stain. A present dye is a quinoline dye, such as that available from Sunbelt Corporation of Rock Hill, S.C. under the trade name Morplas Fluorescent Yellow G Powder (Solvent Yellow 43). More particularly, the dye is a naphthalic acid imide derivative. Other dyes, as well as other colors of dyes will be recognized by those skilled in the art. The present stain, although referred to as yellow in color, appears yellow under natural or ambient lighting conditions, but has a yellow/green appearance when subjected to ultraviolet light.

To enhance the florescence, the stain includes an optical brightener present in a concentration of about 0.5 percent to about 5.0 percent of the stain, and preferably about 1.2 percent of the stain. A preferred optical brightener is an amino coumarin, and preferably 4-methyl, 7-diethyl amino coumarin, commercially available under the trade name Keywhite RWP, from Keystone Aniline Corporation of Chicago, Ill. Other optical brighteners include a coumarin derivative commercially available from Indian Dyestuff Industries, Inc. of Vadadora, Ind., under the product name Fluorescent Brightener No. 140, and a benzo pyranone optical brightener commercially available from Bayer Corporation of Pittsburgh, Pa., under the product name Blankophor SOL.

As will be recognized by those skilled in the art, the present marking stain, having an organic base (e.g., in an organic solvent solution), will adhere to parts and the like the have been coated or otherwise protected with, for example, a light oil. Many such parts are fabricated from carbon steel materials or materials that maybe susceptible to oxidation. As such, upon machining these parts are often coated with a light oil to protect these parts by prevent oxygen from contacting the part surfaces.

The present marking stain is formulated to penetrate the oil coating to permit the stain to contact the part surface. As such, the stain will adhere to the part, and will not "rub-off"

when the part is contacted. Thus, it is anticipated that the parts can be marked with the stain, as after fabrication, and the stain will remain adhered to the part in shipping and handling.

The acrylic resin in the stain is the principle coating agent for the stain. The solvents are present to dissolve the resin and to permit the resin to be carried in solution. The solvents, such as the exemplary acetone and xylene are somewhat volatile, and will thus evaporate after application of the stain. It has also been found that the use of diacetone alcohol (as the dye solvent) tends to reduce or temper the rapid evaporation of the acetone and xylene thus making the present marking stain more readily usable than known stains. However, as set forth above, the use of another aromatic hydrocarbon in lieu of the xylene, may permit reducing or eliminating the need for use of a specific dye solvent.

The solvent further assists in enhancing the flow characteristics of the stain. That is, the solvent is a viscosity modifier or viscosity controlling constituent for the stain. It will be understood by those skilled in the art that the concentration of the solvent must be sufficiently high to dissolve the resin (i.e., to bring the resin to solution), while not being so high that it will adversely affect the film coating of the stain.

In that the marking of the parts is a secondary operation, that is, it does not in and of itself effectuate part fabrication, it must be process that minimally, if at all, impacts the fabrication process and the time and cost to carry out the fabrication process. Thus, a desired marking stain dries quickly, dries well and adheres to the part. To this end, the concentration of the solvent, vis-a-vis the entirety of the stain, must be such that it permits ready application of the stain while providing for rapid drying and a "not-easily removed" mark.

In one use, the marking stain is applied using a "pen," exemplary of which is the pen 10 illustrated in FIG. 1. In such an application, the stain may be further thinned by use of additional solvent. Such a pen 10 includes a body 12 defining a sealed chamber 14 in which the marking stain S is stored. A nib 16 is formed from a porous material, such as felt, and is mounted to the body 12 by a biased valve assembly 18. The nib 16 has a marking end 20 and a supply end 22, from which the stain S is supplied to the marking end 20. A typical pen 10 includes a cap 24 to prevent the pen 10 from drying out. Such a marking pen is commercially available from ITW Mark-Tex of Roseland, N.J.

The nib 16 is biased to an outward position in which it extends outwardly of the body 12 and valve assembly 18. The supply end 22 of the nib is positioned in the valve assembly 18. When a (downward) pressure is applied to the nib 16, the nib 16 urges the valve assembly 18 open which permits the stain S to flow from the chamber 14, into the valve 18 and into contact with the nib supply end 22. This saturates the nib 16 with the stain S which flows through the nib 16 to the marking end 20. Contact of the marking end 20 with an item, thus results in marking the item. Marking pens such as these are well known in the art.

Those skilled in the art will, however, appreciate that the present marking stain can be used in a variety of applications. For example, the stain can be used in the above-noted pen applicator. Alternately, the stain can be provided in bulk form and can be applied by spray, brush or aerosol application. Alternately still, the stain can be applied by dipping the desired part in the liquid stain solution.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A resin based fluorescent marking stain for marking items comprising:
   a resin present in a concentration of about 10 percent to about 20 percent of the marking stain;
   an active solvent for and compatible with the resin present in a concentration of about 65 percent to about 85 percent of the marking stain;
   a plasticizer present in a concentration of about 1.0 percent to about 5.0 percent of the marking stain, the plasticizer being diisononyl phthalate;
   an optical brightener present in a concentration of about 0.5 percent to about 5.0 percent of the marking stain; and
   a fluorescent dye present in a concentration of about 0.1 percent to about 5.0 percent of the marking stain.

2. The fluorescent marking stain in accordance with claim 1 wherein the resin is an acrylic resin.

3. The fluorescent marking stain in accordance with claim 1 wherein the active solvent is acetone and an aromatic hydrocarbon.

4. The fluorescent marking stain in accordance with claim 3 wherein the acetone is present in a concentration of about 45 percent to about 55 percent of the marking stain and the aromatic hydrocarbon is present in a concentration of about 20 percent to about 30 percent of the marking stain.

5. The fluorescent marking stain in accordance with claim 3 wherein the aromatic hydrocarbon is xylene.

6. The fluorescent marking stain in accordance with claim 5 wherein the acetone is present in a concentration of about 45 percent to about 55 percent of the marking stain and the xylene is present in a concentration of about 20 percent to about 30 percent of the marking stain.

7. The fluorescent marking stain in accordance with claim 1 including a dye solvent.

8. The fluorescent marking stain in accordance with claim 7 wherein the dye solvent present in a concentration of about 1.0 percent to about 10.0 percent of the marking stain.

9. The fluorescent marking stain in accordance with claim 8 wherein the dye solvent is diacetone alcohol.

10. The fluorescent marking stain in accordance with claim 1 wherein the optical brightener is an amino coumarin.

11. The fluorescent marking stain in accordance with claim 1 wherein the marking stain is yellow.

12. A resin based fluorescent marking stain for marking items comprising:
   acrylic resin present in a concentration of about 10 percent to about 20 percent of the marking stain;
   xylene and acetone as an active solvent for and compatible with the acrylic resin present in a Concentration of about 65 percent to about 85 percent of the marking stain;
   a dye solvent present in a concentration of about 1.0 percent to about 10.0 percent of the marking stain;
   a plasticizer present in a concentration of about 10 percent to about 5.0 percent of the marking stain, the plasticizer being diisononyl phthalate;
   an optical brightener present in a concentration of about 0.5 percent to about 5.0 percent of the marking stain; and a fluorescent dye present in a concentration of about 0.1 percent to about 5.0 percent of the marking stain.

13. The fluorescent marking stain in accordance with claim 12 wherein the marking stain is yellow.

14. The fluorescent marking stain in accordance with claim 12 wherein the dye solvent is diacetone alcohol.

15. The fluorescent marking stain in accordance with claim 14 wherein the diacetone alcohol is present in a concentration of about 1.0 to about 10.0 percent of the stain.

16. A marking pen comprising:

a porous nib;

a chamber for storing a marking stain, the nip being in fluid communication with the marking stain; and a resin based fluorescent marking stain, the marking stain being formulated from a resin percent in a concentration of about 10 percent to about 20 percent of the marking stain, an active solvent for and compatible with the resin present in a concentration of about 65 percent to about 85 percent of the marking stain, a plasticizer present in a concentration of about 1.0 percent to about 5.0 percent of the marking stain, the plasticizer being diisononyl phthalate, an optical brightener present in a concentration of about 0.5 percent to about 5.0 percent of the marking stain and a fluorescent dye present in a concentration of about 0.1 percent to about 5.0 percent of the marking stain, the fluorescent dye being a quinoline dye.

17. The marking pen in accordance with claim 16 wherein the nib is biasedly mounted for reciprocating movement into and out of the chamber.

18. The marking pen in accordance with claim 16 wherein the fluorescent marking stain is yellow.

19. The marking pen in accordance with claim 16 including wherein the resin based fluorescent marking stain includes a dye solvent present in a concentration of about 1.0 percent to about 10.0 percent of the marking stain.

20. A marking pen comprising;

a porous nib;

a chamber for storing a marking stain, the nip being in fluid communication with the marking stain; and a resin based fluorescent marking stain, the marking stain being formulared from an acrylic resin present in a concentration of about 10 percent to about 20 percent of the marking stain, xylene and acetone as an active solvent for and compatible with the acrylic resin present in a concentration of about 65 percent to about 85 percent of the marking stain, a dye solvent present in a concentration of about 1.0 percent to about 10.0 percent of the marking stain, a diisononyl phthalate plasticizer present in a concentration of about 1.0 percent to about 5.0 percent of the marking stain, an optical brightener present in a concentration of about 0.5 percent to about 5.0 percent of the marking stain, and a fluorescent dye present in a concentration of about 0.1 percent to about 5.0 percent of the marking stain.

* * * * *

UNITED STATES PATENT AND TRADEMARK OFFICE
CERTIFICATE OF CORRECTION

PATENT NO. : 6,828,359 B2
DATED : December 7, 2004
INVENTOR(S) : William Zumdome It is certified that error appears in the above-identified patent and that said Letters Patent is hereby corrected as shown below:

Column 6,
Line 64, should read -- ...a plasticizer present in a concentration of about 1.0 percent to about 5.0 percent of the marking stain... --

Column 7,
Line 12, should read -- ...a chamber for storing the marking stain, the nib being in fluid communication... --

Column 8,
Line 10, should read -- ...a chamber for storing the marking stain, the nib being in fluid communication ... --

Signed and Sealed this

Fifth Day of July, 2005

JON W. DUDAS
*Director of the United States Patent and Trademark Office*